Figure 1:
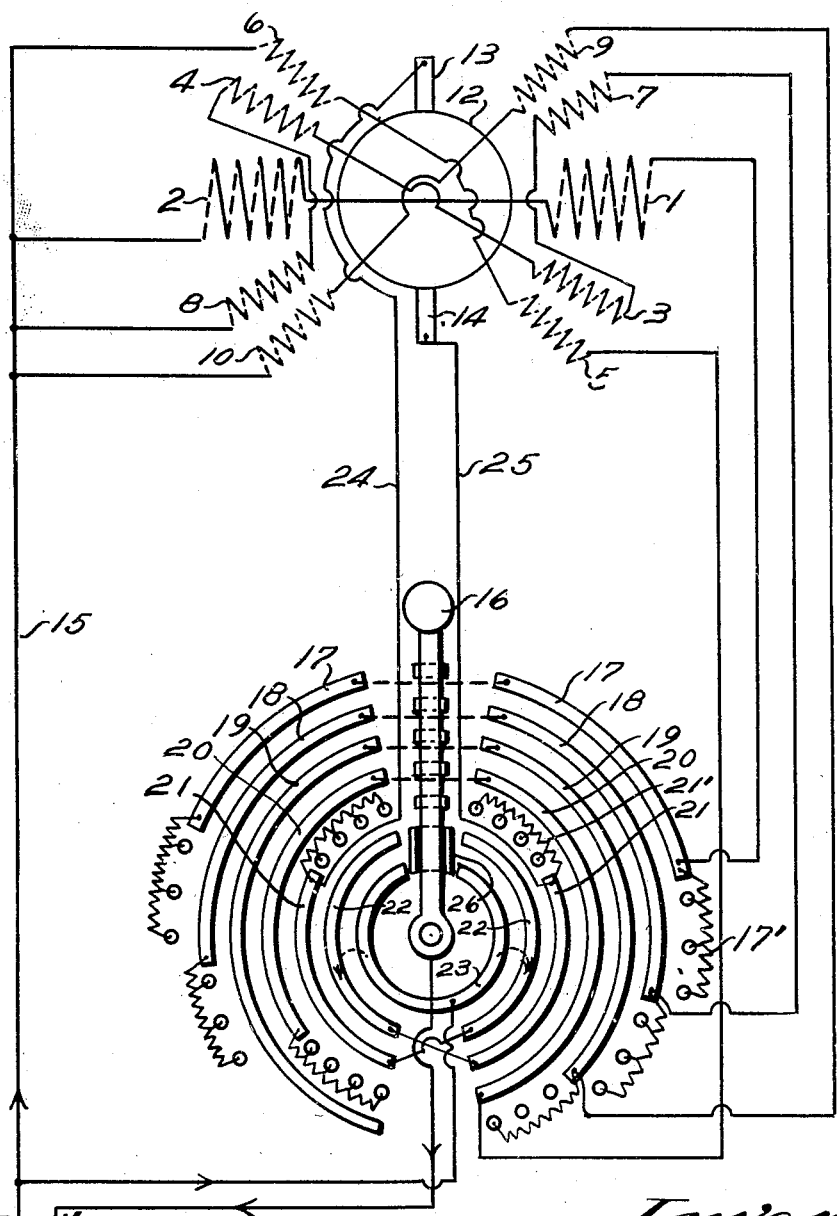

No. 817,807. PATENTED APR. 17, 1906.
C. H. ROTH.
ELECTRIC MOTOR.
APPLICATION FILED DEC. 27, 1904.
3 SHEETS—SHEET 2.
Fig. 2.
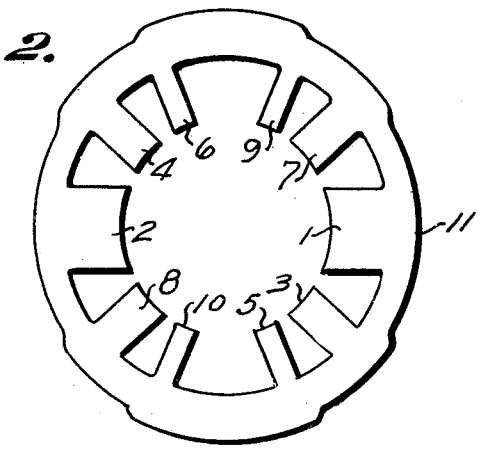
Fig. 3. 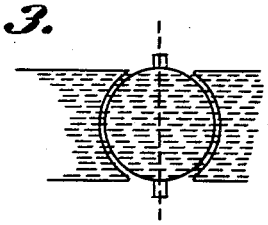 Fig. 4. 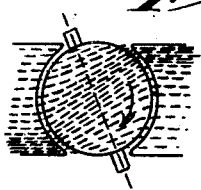
Fig. 5. 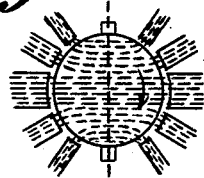 Fig. 6. 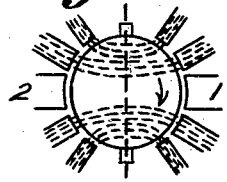 Fig. 7. 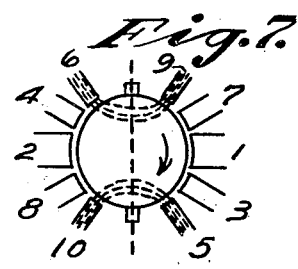
Fig. 8. 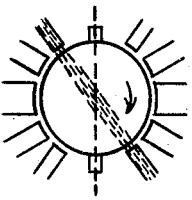 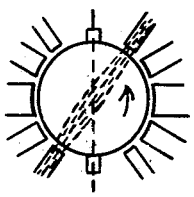 Fig. 9.
Witnesses: Inventor,
Chas. H. Roth,
by Rummler & Rummler,
Attorneys.

No. 817,807. PATENTED APR. 17, 1906.
C. H. ROTH.
ELECTRIC MOTOR.
APPLICATION FILED DEC. 27, 1904.

3 SHEETS—SHEET 3.

UNITED STATES PATENT OFFICE.

CHARLES H. ROTH, OF CHICAGO, ILLINOIS, ASSIGNOR TO ROTH BROS. & CO., OF CHICAGO, ILLINOIS, A CORPORATION OF ILLINOIS.

ELECTRIC MOTOR.

No. 817,807.     Specification of Letters Patent.     Patented April 17, 1906.

Application filed December 27, 1904. Serial No. 238,398.

*To all whom it may concern:*

Be it known that I, CHARLES H. ROTH, a citizen of the United States of America, and a resident of Chicago, in the county of Cook and State of Illinois, have invented certain new and useful Improvements in Electric Motors, of which the following is a specification.

This invention relates to dynamo-electric machines and has particular reference to the class of motors which are intended to be driven at various speeds.

This invention aims principally to produce a type of motor which will operate efficiently and without sparking when the brushes are set to a fixed position regardless of the speed or direction of rotation of the armature.

It is well understood that to secure good commutation without shifting the brushes it is necessary that the magnetic field be kept stable as regards position. This has particular reference to the position of the neutral plane. Any shifting of the magnetism shifts the neutral plane out of alinement with the brushes and causes sparking at the brushes. In motors where the fields are weakened to produce changes in speed this tendency to sparking increases as the magnetism of the poles is reduced below saturation, since the magnetism under these conditions shifts easily under the armature reaction, and accordingly shifts the commutation-point. When the poles are magnetically saturated, shifting of the magnetism is to a large extent prevented, and a practically fixed point of commutation is preserved.

The main objects of this invention are to produce a type of motor in which the speed may be regulated by varying the strength of the magnetic fields and at the same time maintaining a fixed point of commutation regardless of the speed or direction of rotation of the armature; to provide an improved arrangement of field-cores and field-circuits whereby the aggregate strength of the magnetic field may be altered, while the parts of such field which are nearest to the neutral plane will be maintained in a magnetically-saturated condition, and thereby prevent the shifting of the magnetic field through armature reaction, and to provide an improved form of field-framework particularly adapted for machines in which each pole is made up of a plurality of individually-excited parts.

I accomplish these objects by the device shown in the accompanying drawings, in which—

Figure 10:
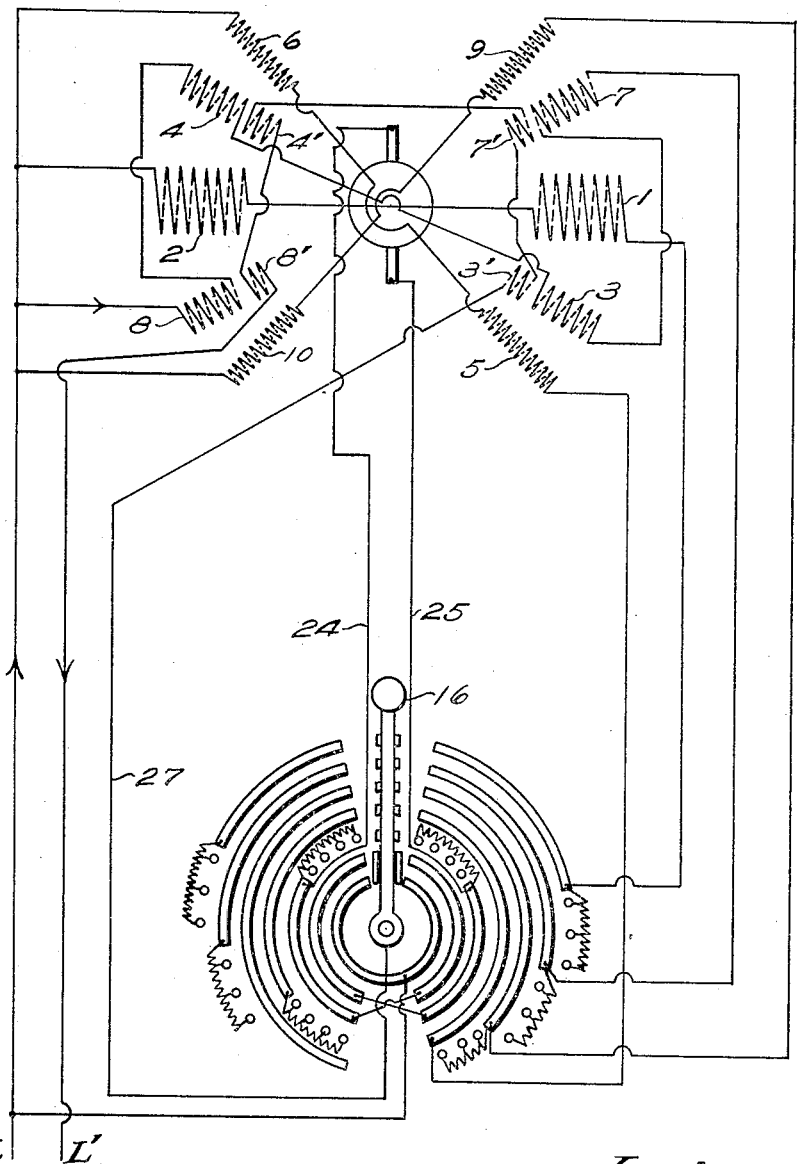

Figure 1 shows diagrammatically the windings of a bipolar motor constructed according to my invention, together with a type of controller for regulating the speed of such motor. Fig. 2 is an end elevation of the magnetic frame of the same motor. Fig. 3 illustrates the distribution of magnetism in the armature and poles of an ordinary bipolar motor when the same is running under no load. Fig. 4 illustrates the magnetic conditions in the same motor when the same is running under heavy load and weakened field. Fig. 5 shows a motor constructed according to the herein-described invention when running under full field strength and at its slowest speed. Fig. 6 illustrates the effect of the magnetic field of the same motor when the main cores of each of the poles are demagnetized. Fig. 7 illustrates the effect of demagnetizing all parts of the pole structure except the trailing and leading parts of each pole, which are maintained in a saturated condition and prevent shifting of the commutation-point. Fig. 8 shows the demagnetization of all parts of the pole structure except the trailing ends of each pole, with the armature revolving in a right-handed direction. Fig. 9 shows similar conditions when the rotation of the armature is left-handed. Fig. 10 is a diagrammatic view corresponding to Fig. 1, but showing compound winding on some of the cores.

In the construction shown in the drawings the magnetic frame of the motor consists of an annular yoke 11, having two groups of radially-disposed cores secured thereto and extending inwardly therefrom and having their inner ends conforming to the arc of a circle for the reception of the armature. In the form shown each group consists of five cores, (indicated by the reference-numerals 1 to 10, inclusive.) Each group consists of a main core having a plurality of supplemental cores arranged at each side of the same, the main cores 1 and 2 being considerably larger than the supplemental cores, and the combined areas of the intermediate cores being much greater than the combined areas of the end cores of each group. The yoke 11, as will be seen in Fig. 2, has a certain transverse sectional area at each of the main cores and is successively increased in sectional area at each of the successive cores on each side of the main poles. Thus the yoke is of greatest transverse sectional area between the poles 6 and 9 and the poles 5 and 10, the increase in sectional area in each case being proportionate to the magnetic flux from the corresponding cores. This arrangement provides the desired magnetic conductivity with a minimum weight of iron.

In Fig. 1 the windings of the various cores are indicated by reference-numerals corresponding to the same cores in Fig. 2. The armature is indicated by the reference-numeral 12. The brushes are indicated at 13 and 14, and the connections between the various windings of the cores will be clearly understood from Fig. 1.

The line conductors, connecting the motor with the source of current, are indicated at L L'. In the form of field-winding which is shown in the drawings the main cores 1 and 2 are in the same circuit with each other. The cores 8, 4, 3, and 7 are in a second circuit independent of the circuit of the cores 1 and 2. The cores 5 and 6 form another independent circuit, and the cores 9 and 10 still another. One end of each of the field-circuits connects through the conductor 15 with the line conductor L, and the other end of each of the said circuits connects to its individual bar of the controller, as will be hereinafter described. The controller-arm 16 is connected with the conductor L' of the line and is provided with a plurality of contact-shoes for engaging the various bars and buttons of the controller.

Of the controller-bars numbered 17, 18, 19, and 20 each connects, respectively, with one of the field-circuits. The bars 21, 22, and 23 connect with the armature-circuit. The right and left parts of the controller correspond, respectively, to the right and left hand rotation of the armature. The right and left bars 17, 18, 19, and 20 are respectively connected together by the conductors indicated by dotted lines at their upper ends. These conductors are so indicated to show that the arm 16 is insulated from said conductors when in the position shown in Fig. 1, in which case none of the motor-circuits are closed. The bars 21 are respectively connected to the brushes 13 and 14 by the conductors 24 and 25. The bars 22 are cross-connected at their lower ends with the bars 21—that is, the right-hand bar 22 is connected with the left bar 21 and the left-hand bar 22 is connected with the right-hand bar 21. The bar 23, which is continuous from left to right, is connected to the line conductor L. The shoes 26 on the arm 16, which bear on the bars 22 and 23, are insulated from the arm 16, but are connected together, so that said shoes merely act as a connection beween the bars 22 and 23, and when the arm 16 is turned toward the right the armature-current will flow in one direction, while the direction of such current will be reversed when the arm 16 is turned toward the left.

The contact-bars of the controller are of various lengths, and some of the bars are broken up to form contact-points for inserting resistance into the respective circuits, such resistance being indicated in the conventional way.

In the form shown in Fig. 10 the main cores 1 and 2 and the outer supplemental cores 5, 6, 9, and 10 are provided with windings connected as shunts of the armature-circuit in the same manner as in Fig. 1. The cores 3, 4, 7, and 8 are also provided with shunt-windings, as in Fig. 1, and in addition to such windings are provided with other windings which are connected in series with the armature-circuit. In Fig. 10 the shunt-windings are indicated by numerals corresponding to their respective cores. The series windings are indicated by accented numerals. In this case the line-conductor L' is connected with the series coils 8', 4', 7', and 3', the conductor 27 connecting the coil 3' with the switch-lever 16.

The operation of the device shown is as follows: When the arm 16 is in the position shown in Fig. 1, all circuits in the motor will be open, and the armature will accordingly be at a standstill. When the arm 16 is turned to the right in starting, all of the field-circuits will at first receive the full strength of the current; but the armature-circuit will be at its minimum through the introduction of the resistance 21'. This is the condition which is best for starting the motor, and the resistance in the armature-circuit prevents an abnormal rush of current therein. As the arm 16 is turned farther to the right resistance will be gradually cut out of the armature until the arm 16 comes into contact with the bar 21, when the armature will be receiving the full strength of the current, and the motor will then carry its full load at its slowest speed. As the controller-lever is still farther moved to the right resistance is gradually introduced into the circuit of the poles 1 and 2 until such circuit is entirely open. Then through the continued movement of the lever 16 resistance is gradually introduced into the circuit of the poles 8, 4, 3, and 7, and finally the circuits of all the intermediate poles are cut out. Now only the poles 5, 6, 9, and 10 are magnetically excited Under some conditions it may be desirable to reduce the current in the leading poles in order to obtain an abnormally high speed and still preserve good commutation with fixed brushes. This can be accomplished by a still further movement of the lever 16, whereupon resistance is introduced into the circuit of the poles 9 and 10. Exactly the same conditions arise when the lever-arm 16 is turned toward the left, except that the armature-circuit is then reversed, and the final introduction of the resistance takes place in the poles 6 and 5, which are in this case the leading poles. It will be noticed that under all conditions the circuits of the trailing poles carry the full force of the current, and thus remain magnetically saturated and prevent backward shifting of the point of commutation.

It will be seen that a large range of speed can be obtained in a motor constructed according to my invention, as it is necessary for good commutation to have only enough field strength in the four poles 5, 6, 9, and 10 to prevent the demagnetization of the field-frame by the maximum loads to which the motor will be subjected. These poles will therefore be comparatively small and the range of speed will be in about the ratio of the size of these poles to the size of all of the poles combined. Thus if the poles 5, 6, 9, and 10 represent one-tenth of the entire pole area then the range of speed of the motor would be about ten to one. With the method of introducing resistance which has been herein described almost any speed between the limits determined by the winding of the fields and the relative sizes of the poles may be obtained by shifting the lever of the controller.

The comparative magnetic conditions which prevail during speed adjustments of the ordinary type of motor and the herein-described form are graphically illustrated in Figs. 3 to 9, inclusive.

In Fig. 3 is shown the magnetic condition of the field in the vicinity of the armature of an ordinary two-pole motor when the same is running under full field strength without load. In this case the rotation of the armature is unresisted, and there is accordingly no armature reaction to distort the magnetic field.

In Fig. 4 the same motor is shown under load, but with reduced field strength. The fields are in this case magnetized below the state of saturation and the armature reaction causes the magnetism to crowd back, the trailing part of the pole being to a considerable extent demagnetized, while the leading part or part of the pole which is in advance of the armature approaches a condition of magnetic saturation. This corresponds virtually to shifting the position of the poles and causes a corresponding shifting of the commutation-point, making it necessary to shift the brushes to some such position, as is indicated in the drawings, to prevent sparking.

It will thus be seen that with the ordinary type of motor it is necessary to shift the brushes from the position of the neutral point at no load to the position of the neutral point at heavy load in order to get the best results. This position in actual practice is necessarily a compromise between the best position at no load and the best position at full load. This is especially true in the case of efficient motors where the armature reaction is greater than in motors of low efficiency. It will also be seen that when the brushes are set to the best position for rotation of the armature in one direction a reversal of the direction of rotation would shift the magnetism to the opposite side of the poles and result in furious sparking at the brushes.

When a motor constructed according to my herein-described invention is operated under full load and at its slowest speed, the field about the armature would be represented graphically by Fig. 5. All of the poles are saturated with magnetism, and there is accordingly no shifting of the points of commutation. The speed may now be increased by reducing the strength of the field. The field strength is at first gradually reduced through the introduction of resistance into the windings of the cores 1 and 2. Then the field strength may be still further reduced by the cutting out of the coils 1 and 2 and introducing resistance into the circuit of the poles 8, 4, 7, and 3. No change in the position of the commutation-points takes place even when the field is weakest, since the trailing poles 5 and 6 always remain saturated with magnetism, and their magnetism can therefore not be shifted by the armature reaction. This condition remains true even after the leading poles 9 and 10 or 5 and 6, whichever the case may be, have been reduced below their point of saturation or cut out entirely from the circuit. It will thus be seen that by properly changing the strength of the various parts of the field the commutation-point may be kept constant at all speeds. With a controller constructed as herein shown the desired results are accomplished by merely shifting one lever.

One of the other great advantages of this form of motor is its adaptability to use as a compound motor, giving the advantage of being able to obtain at will any speed within the range of the motor and maintain such speed practically constant and without variation due to change of load. It will be seen that some of the supplemental poles, preferably the poles 3, 4, 7, and 8, may be compound wound (see Fig. 10) and will then have a certain uniform effect as to speed variation from no load to full load no matter what the total field strength may be. In this case the main poles 1 and 2 can be varied at will for different speeds, and the compound winding of the supplemental poles will compensate for sudden changes in the load. Further, the compound winding will affect only such poles which are compound wound and which are a certain percentage of the total pole structure. It will thus be possible to produce any predetermined speed and maintain such speed regardless of the change of load within certain limits.

In an ordinary compound motor the series and shunt coils both act on the entire pole strength, and if the shunt-coils are weakened to change the speed the series coils have a greater effect on the weakened field, so that the weaker the current in the shunt-coils the nearer does the motor take on the characteristics of a series motor, which varies in speed according to the load it is called upon to carry.

By compounding the large central poles 1 and 2 the characteristics of a series motor can be obtained, except that the supplemental poles in shunt would set a predetermined limit to the speed.

By compounding the poles 3, 4, 7, and 8, as in Fig. 10, the motor would tend to maintain a practically constant speed regardless of changes in the load. Changes in speed would then be controlled by varying the strength of the poles 1 and 2. The series windings on these poles would produce a strong field due to sudden increase of load and would thus neutralize the effect of armature reaction and help the poles 5, 6, 9, and 10 in maintaining a fixed commutation-point. This is especially true in cases of extreme overload, which would tend to demagnetize the poles 5, 6, 9, and 10.

By compounding the outer poles 5, 6, 9, and 10 the effect would be somewhat the same as in the case of compounding the poles 3, 4, 7, and 8, although it is preferable to have a constant and saturated field between the outer poles for reasons already given.

The principles which are herein described as applied to a motor could also be applied to a dynamo which is designed to be driven from sources of power in which the speed is not always constant.

It will be seen that numerous details of the construction shown may be altered without departing from the spirit of my invention.

What I claim as my invention, and desire to secure by Letters Patent, is—

1. In a device of the class described, the combination of a field-magnet having a main pole and two supplemental poles, all of like polarity, one of said supplemental poles being located at each side of said main pole, the combined areas of said supplemental poles being less than that of the main pole; and means for changing the magnetic strength of said main pole without affecting the strength of said supplemental poles, substantially as described.

2. In a dynamo-electric machine, the combination of an armature; a field-magnet having a pair of magnetically-opposed groups of cores, each group comprising a pair of end cores and a plurality of intermediate cores all having like poles opposed to the armature, the polar areas of said end cores being small compared to the combined area of the intermediate cores; and means for changing the magnetic strength of the intermediate cores without affecting that of the end cores.

3. In a dynamo-electric machine, the combination of an armature; a field-magnet having a pair of magnetically-opposed group of cores each group comprising a pair of end cores and three intermediate cores all having like poles opposed to the armature, the polar areas of said end cores being small compared to the combined polar area of the intermediate cores; windings on said machine; and a controller arranged to gradually reduce the magnetic strength first of the middle core and then of the next adjacent cores, without affecting that of the end cores.

4. In a dynamo-electric machine, the combination of an armature; a field-magnet having a pair of magnetically-opposed group of cores, each comprising a middle core, a pair of end cores located on opposite sides of the middle core, and a pair of intermediate cores respectively located between the middle core and each end core, all of said cores having like poles opposed to the armature; windings on the middle and end cores connected as a shunt of the armature-circuit; windings on the intermediate poles connected in series with the armature; and means for varying the magnetic strength of the middle cores without affecting that of the end cores of each group.

5. In a dynamo-electric machine, the combination of an armature; a field-magnet having a pair of magnetically-opposed group of cores, each comprising a middle core, a pair of end cores located on opposite sides of the middle core, and a pair of intermediate cores respectively located between the middle core and each end core, all of said cores having like poles opposed to the armature; windings on all of said cores connected as a shunt of the armature-circuit; additional windings on the intermediate poles connected in series with the armature; and a variable resistance in circuit with the shunt-windings of the middle and intermediate cores, whereby the magnetic strength of said middle and intermediate cores may be altered without affecting that of the end cores.

Signed at Chicago this 23d day of December, 1904.

CHARLES H. ROTH.

Witnesses:
EUGENE A. RUMMLER,
GLEN C. STEPHENS.